US012808518B1

(12) United States Patent
Wu

(10) Patent No.: US 12,808,518 B1
(45) Date of Patent: Nov. 24, 2026

(54) MODULAR LED LUMINAIRE

(71) Applicants: HUIZHOU HANXING OPTOELECTRONICS TECHNOLOGY CO., LTD., Huizhou (CN); LEDTURE INC., San Bernardino, CA (US); Hongge Wu, Qinzhou (CN)

(72) Inventor: Hongge Wu, Qinzhou (CN)

(73) Assignees: Huizhou Hanxing Optoelectronics Technology Co., Ltd., Huizhou (CN); Hongge Wu, Qinzhou (CN); Ledture Inc., San Bernardino, CA (US)

( * ) Notice: Subject to any disclaimer, the term of this patent is extended or adjusted under 35 U.S.C. 154(b) by 8 days.

(21) Appl. No.: 19/411,560

(22) Filed: Dec. 8, 2025

(30) Foreign Application Priority Data

Sep. 30, 2025 (CN) ........................ 202511424161.8

(51) Int. Cl.

| | |
|---|---|
| ***F21V 19/00*** | (2006.01) |
| ***F21S 2/00*** | (2016.01) |
| ***F21S 8/08*** | (2006.01) |
| ***F21V 15/01*** | (2006.01) |
| ***F21V 15/015*** | (2006.01) |
| ***F21V 29/70*** | (2015.01) |
| ***F21Y 115/10*** | (2016.01) |

(52) U.S. Cl.

CPC .......... *F21V 19/0035* (2013.01); *F21S 2/005* (2013.01); *F21S 8/086* (2013.01); *F21V 15/01* (2013.01); *F21V 15/015* (2013.01); *F21V 29/70* (2015.01); *F21Y 2115/10* (2016.08)

(58) Field of Classification Search

CPC ........ F21V 15/01; F21V 15/015; F21S 8/086; F21S 2/005

See application file for complete search history.

(56) References Cited

U.S. PATENT DOCUMENTS

| | | | | |
|---|---|---|---|---|
| 7,934,851 | B1 * | 5/2011 | Boissevain | F21V 29/763 362/249.02 |
| 2008/0080162 | A1 * | 4/2008 | Wilcox | F21V 29/75 362/20 |
| 2009/0086472 | A1 * | 4/2009 | Kinnune | F21V 23/026 362/157 |
| 2009/0251898 | A1 * | 10/2009 | Kinnune | F21V 19/04 362/249.02 |

(Continued)

*Primary Examiner* — Alexander K Garlen

(74) *Attorney, Agent, or Firm* — Ming Jiang; OPENPTO US LLC

(57) ABSTRACT

The invention discloses a modular LED luminaire including a housing, multiple light source modules, and a power module. The housing is formed by joining a near-end housing and a far-end housing, and both ends of the housing are open. Open ends of the near-end housing and the far-end housing on the same side are closed and connected by a sealing cover plate, and the power module is accommodated inside the near-end housing. A recessed step surface is provided on respective surfaces of the near-end housing and the far-end housing that face in the same direction as emitting surfaces of the light source modules, and opposite ends of each light source module are mounted on the respective step surfaces. Multiple light sources are arranged in a matrix on each emitting surface, and a removable substrate defining multiple through-holes is mounted on the emitting surface.

10 Claims, 9 Drawing Sheets

(56) References Cited

U.S. PATENT DOCUMENTS

| | | | | |
|---|---|---|---|---|
| 2013/0027937 | A1* | 1/2013 | Winters | F21V 29/508 362/362 |
| 2013/0088861 | A1* | 4/2013 | Wu | F21V 21/00 362/244 |
| 2014/0104836 | A1* | 4/2014 | Kinnune | F21V 23/002 362/249.02 |
| 2014/0218944 | A1* | 8/2014 | Hobson | F21V 15/013 362/418 |
| 2016/0153649 | A1* | 6/2016 | Wilcox | F21V 15/013 362/234 |
| 2019/0086047 | A1* | 3/2019 | Jiang | F21V 23/009 |
| 2023/0408068 | A1* | 12/2023 | Wu | F21V 31/005 |

* cited by examiner

MODULAR LED LUMINAIRE

TECHNICAL FIELD

The present invention relates to the technical field of LED lighting, and more particularly to a modular LED luminaire.

BACKGROUND

In public lighting projects, especially for municipal street luminaires, landscape garden luminaires, and similar installations, regional installation standards often impose stringent requirements on overall appearance consistency of luminaires, photometric performance, and mounting and fixing modes. Modular LED luminaires, due to their high luminous efficacy and long service life, have been widely used in outdoor lighting applications such as roads and squares. However, existing modular LED luminaires have revealed the following technical deficiencies in long-term use.

First, in terms of optical light distribution, conventional luminaires mostly adopt integral lenses or reflectors for light distribution. This approach has two main drawbacks. On the one hand, the precision of light distribution is limited, making it difficult to form a very sharp cut-off line, which is prone to glare and may pose safety risks to drivers and pedestrians, and also fails to meet increasingly stringent glare control standards. On the other hand, optical components and light source modules are mostly configured as integral or non-adjustable structures, such that optical solutions cannot be flexibly replaced or adjusted according to different application scenarios (for example, different road widths, pole heights, and luminaire spacing), resulting in poor adaptability and increased customization costs for projects.

Second, in terms of thermal management, problems of heat dissipation and thermal isolation are prominent in high-power modular LED luminaires. In existing designs, the light source module is usually fastened directly to the housing by screws or thermally connected through a large contact area. Such structures cause a large amount of heat generated by the light source to be rapidly conducted to the entire housing, and inevitably transferred to the power module located at the near-end of the housing. When the power module (especially the electrolytic capacitors therein) operates in a high-temperature environment over a long period, its service life is dramatically reduced, leading to an increased failure rate of the entire luminaire. The effective service life of the luminaire is thus much lower than the theoretical service life of the LED light source itself, forming a "barrel effect." In addition, the heat-dissipation efficiency improvement of commonly used fin-type heat sinks has approached a bottleneck, and fins are prone to dust accumulation in complex outdoor conditions, which further impairs heat dissipation.

Third, in terms of structural maintenance, many existing luminaires adopt integral or encapsulated structures that are extremely inconvenient to disassemble and service. When a single light source module or power module fails, it is often necessary to remove the entire luminaire and open a main sealing interface. The maintenance process is complicated, time-consuming, and labor-intensive, which increases the difficulty and cost of municipal maintenance.

Accordingly, there is an urgent need in the art for a novel modular LED luminaire structure that combines precise light-distribution capability, excellent thermal isolation performance, high heat-dissipation efficiency, and convenient maintenance, so as to systematically solve the above technical problems.

SUMMARY

To overcome the shortcomings and deficiencies of the prior art, the present invention is directed to a modular LED luminaire that combines precise light-distribution capability, excellent thermal isolation performance, and high reliability.

The specific technical solution of the present invention is as follows.

The modular LED luminaire provided by the present invention includes a frame-shaped housing, multiple light source modules mounted inside the housing, and a power module. The housing is formed by butt-jointing a near-end housing and a far-end housing that are independent from each other. Both ends of the near-end housing and the far-end housing are open. Open ends of the near-end housing and the far-end housing on the same side are closed and connected by a sealing cover plate, and the power module is accommodated inside the near-end housing. On a side of the near-end housing that faces in the same direction as light-emitting surfaces of the light source modules, a distal end is provided with a near-end stepped surface. On a side of the far-end housing that faces in the same direction as the light-emitting surfaces of the light source modules, a near-end is provided with a far-end stepped surface. Opposite ends of each light source module are mounted on the near-end stepped surface and the far-end stepped surface.

A matrix of light sources is arranged on the light-emitting surface of each light source module. A substrate is provided on the light-emitting surface of each light source module by a detachable connecting mechanism. Multiple through-holes are formed in the substrate. Each through-hole corresponds to at least one light source in the corresponding light source module, and an opening size of each through-hole is adapted to an outer profile size of the corresponding light source. A light-blocking mechanism is provided on the substrate. The light-blocking mechanism includes a light-blocking panel that is fixed to a surface of the substrate and is disposed vertically or obliquely along at least one side of a circumferential edge of the through-hole.

In one preferred technical solution, a wall thickness of the near-end housing is from 1 mm to 5 mm. An inner wall surface of the near-end housing is provided with a number of arcuately raised strip-shaped ribs, and an inner threaded hole is formed at an end of each strip-shaped rib facing toward the open end. A side of the sealing cover plate facing inward is provided with outwardly projecting frames respectively adapted to the open ends of the near-end housing and the far-end housing. A gasket receiving groove recessed inward is formed in an edge of a main body of the cover plate outside the outwardly projecting frame corresponding to the near-end housing. A sealing gasket with a surface exposed is accommodated in the receiving groove. Screw holes for mounting locking screws are formed in the sealing cover plate at positions corresponding to the strip-shaped ribs. A middle portion of an inner wall surface of the sealing cover plate is provided with a number of reinforcing ribs.

In one preferred technical solution, the through-holes are formed for respective light sources on the light source module, or a number of adjacent light sources that are located in a same horizontal row, a same vertical column, or a same diagonal direction are combined as a light source group, and an opening size of each through-hole is adapted to an outer profile size of the corresponding light source group. The light-blocking mechanism has a configuration in which the light-blocking panel is provided at an edge of a single through-hole, or at a same-side edge of multiple through-holes that are linearly arranged along a length direction or a radial direction of the substrate.

In one preferred technical solution, a surface of the near-end housing that faces in a same direction as an emission direction of the light source modules is a first panel, and a housing wall surface of the near-end housing that adjoins an inner side of the near-end stepped surface is an abutment surface. A first gap is formed by excavating downward at a side of the near-end stepped surface close to the abutment surface. A second gap is formed by extending horizontally from a bottom of the first gap toward a side away from the abutment surface. A connecting boss is formed at a position of the near-end stepped surface above the second gap. The first gap and the second gap together define an L-shaped heat-insulating cavity surrounding a root of the connecting boss. A connecting end of the light source module is fixed onto the connecting boss by a connecting member, and a clearance is left between an outer side wall of the connecting end and the abutment surface.

In one preferred technical solution, the near-end stepped surface is formed with a power interface, and a sealed cable connector is inserted in the power interface. A plate surface of the first panel facing away from the light source modules is set as a power-module mounting surface. The power module has one flat surface that is in close contact with the power-module mounting surface. Connection tabs are provided at opposite ends of the power module, and the connection tabs are locked to the power-module mounting surface by screws.

In a further preferred technical solution, a heat sink is provided on a back surface of each light source module. The heat sink includes a first heat-dissipation plate on which the light source module is mounted. Second heat-dissipation plates integrally extend from opposite sides of a non-mounting surface of the first heat-dissipation plate. Opposite ends of the two second heat-dissipation plates are connected by a third heat-dissipation plate so that a ventilation flow channel having a quadrilateral cross-section and open at two sides is formed. A number of heat-dissipation slots extending toward an interior of the third heat-dissipation plate and toward the first heat-dissipation plate are formed in the third heat-dissipation plate, and the heat-dissipation slots partially extend into interiors of the two second heat-dissipation plates.

Based on the above inventive principles, the advantageous effects of the present invention are as follows.

By virtue of the design of the detachable substrate and the light-blocking mechanism provided thereon, the luminaire according to the present invention provides physical shielding for each light source or light source group, enabling precise control of the light-emitting angle and forming a sharp cut-off line, thereby effectively eliminating glare and meeting stringent road lighting standards. The modular substrate design allows flexible replacement of light-distribution schemes according to requirements of different scenarios, providing strong adaptability.

The luminaire of the present invention provides efficient thermal management and thermal isolation for the power module. By providing the connecting boss on the first panel and the L-shaped heat-insulating cavity (the first gap and the second gap) surrounding a root of the connecting boss, the design greatly reduces a path and contact area for heat conduction from the light source module to the near-end housing where the power module is mounted, thereby forming an effective thermal barrier. In combination with a heat dissipation gap formed by a metal washer on a connecting screw, critical thermal isolation between a high-temperature region of the light source and the power module is achieved, significantly reducing an operating temperature of the power module and extending its service life. The heat sink adopts a ventilation flow channel structure having a quadrilateral cross-section, and the heat-dissipation slots that extend into the second heat-dissipation plates are formed in the third heat-dissipation plate. This significantly increases a heat-dissipation area and promotes air convection while ensuring structural strength, providing high heat-dissipation efficiency and making the structure less prone to dust accumulation.

The modular housing structure of the luminaire adopts a modular spliced frame structure in which the near-end housing and the far-end housing are connected by the light source modules and locked at two sides by the sealing cover plates. By simply removing the sealing cover plate at a side, an operator can readily access and individually remove and replace any light source module or the power module without removing the entire luminaire, thus achieving rapid maintenance and greatly reducing maintenance cost and time. The sealing cover plate adopts a pre-compressed sealing gasket design that closely cooperates with the strip-shaped ribs at the open ends of the housing, ensuring that the luminaire as a whole achieves a high protection rating of IP66 or higher, effectively preventing ingress of rainwater and dust in outdoor environments and ensuring long-term stable operation of the luminaire under harsh conditions, thereby providing excellent sealing and protection performance.

In addition, the frame-shaped housing together with the internal light source modules forms a robust supporting frame with stable structure. A laser provided for auxiliary positioning facilitates rapid and accurate alignment during installation, thereby improving construction efficiency.

DETAILED DESCRIPTION OF THE EMBODIMENTS

The present invention is intended to address four long-standing issues associated with high-power LED luminaires: poor heat dissipation, vulnerability of the power module, severe glare, and difficulty in maintenance. Through an integrated design that combines an innovative modular frame, a thermal isolation structure, and an adjustable light-blocking mechanism, the reliability, optical performance, and lifecycle efficiency of the luminaire are significantly improved. The luminaire is particularly suitable for public lighting applications, such as roads and plazas, where reliability and optical quality are strictly required.

The following embodiments are provided to further illustrate the present invention but should not be construed as limiting the invention. Modifications or substitutions to the methods, steps, or conditions of the present invention that do not depart from its spirit and essence fall within the scope of the invention.

Figure 1:
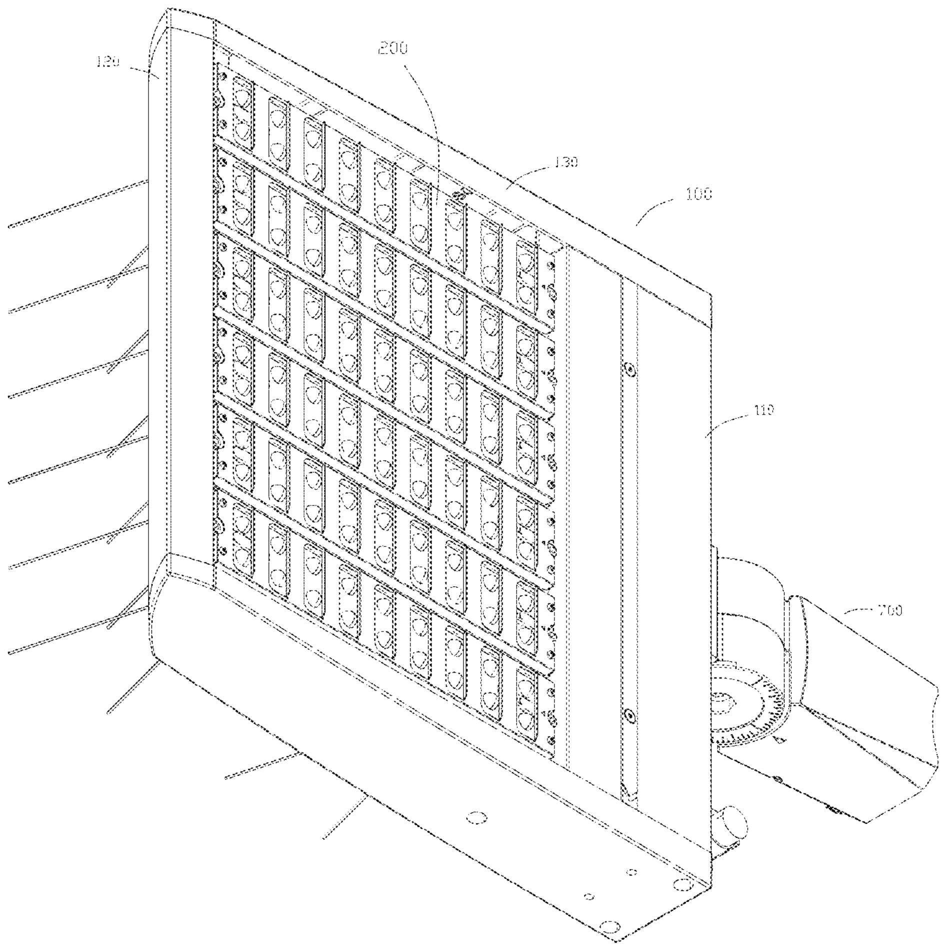
FIG. 1 is a schematic view showing an overall structural configuration of one embodiment of the modular LED luminaire according to the present invention.
Figure 2:
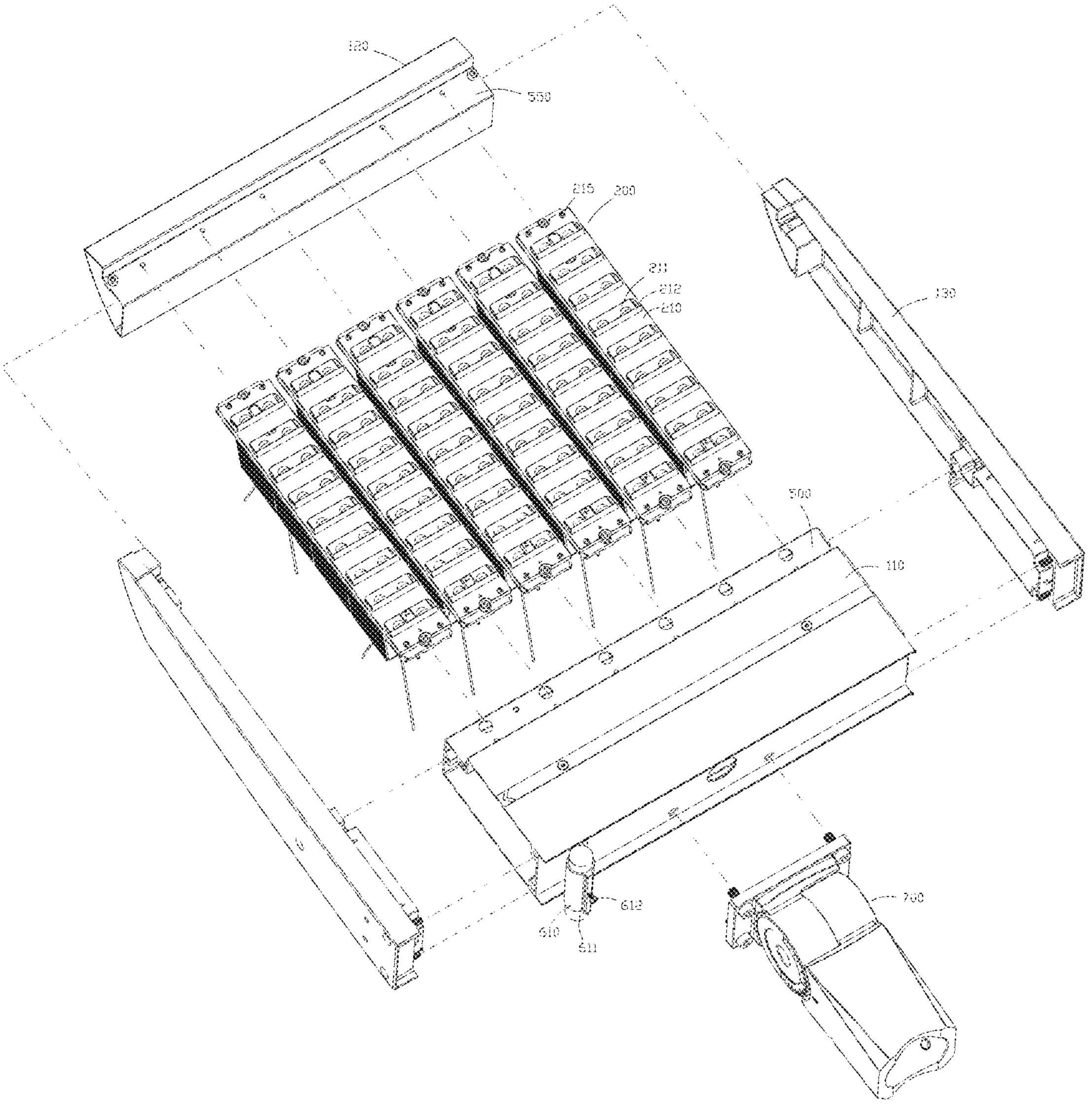
FIG. 2 is an exploded structural schematic view of one embodiment of the modular LED luminaire according to the present invention.

As shown in FIGS. 1-2, a modular LED luminaire according to the present invention includes a frame-shaped housing 100, multiple light source modules 200 mounted inside the housing 100, and a power module 300. An end of the housing 100 connected to a lamp pole is a near-end, and the power module 300 is accommodated inside the near-end of the housing 100. The light source modules 200 are arranged at intervals along the frame of the housing 100. One side of each light source module 200 is mounted on an inner wall of the housing 100 at the proximal side near the power module 300, and the other side is fixed to an inner wall of the distal side of the housing 100. Multiple light sources are arranged in a matrix on a light-emitting surface of each light source module 200.

The housing 100 adopts a frame-shaped structural design, and is mainly assembled from a near-end housing 110, a far-end housing 120, and two sealing cover plates 130 located on opposite sides. The near-end housing 110 has an open-ended cavity structure on both sides, and an end away from the lamp pole forms a mounting portion for the light source modules. An interior space of the near-end housing 110 is dedicated to accommodating the power module 300. The far-end housing 120 also has an open-ended cavity structure on both sides and is arranged opposite the near-end housing 110 to form a distal end of the housing 100.

The near-end housing 110 and the far-end housing 120 are connected and supported through the light source modules 200. Specifically, one end (near-end) of each light source module 200 is fixed to the inner wall of the near-end housing 110, and the other end (distal end) is fixed to the inner wall of the far-end housing 120, thereby forming a robust supporting frame between them. In a specific embodiment, the sides of the near-end housing 110 and the far-end housing 120 that face in the same direction as the light-emitting surfaces of the light source modules 200 are respectively provided with near-end stepped surfaces 500 and far-end stepped surfaces 550. Opposite ends of the light source modules 200 are mounted on the near-end stepped surface 500 and the far-end stepped surface 550. The sealing cover plates 130 are fixed to the sidewalls of the near-end housing 110 and the far-end housing 120 by locking screws 131 so that the entire housing 100 is locked into a rigid integral structure.

Figure 3:
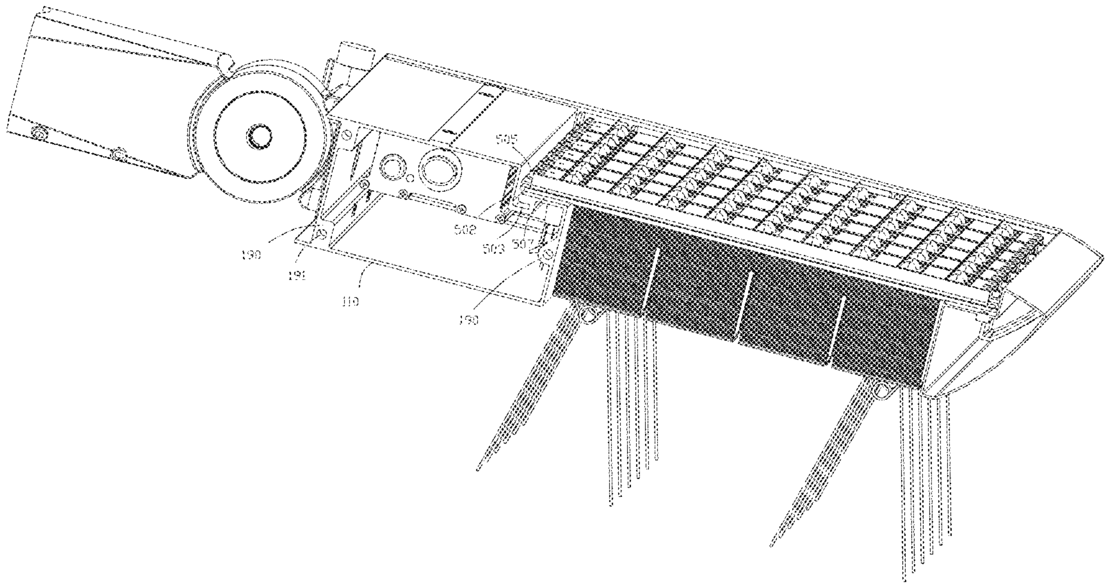
FIG. 3 is a side sectional schematic view of the modular LED luminaire according to the present invention.
Figure 4:
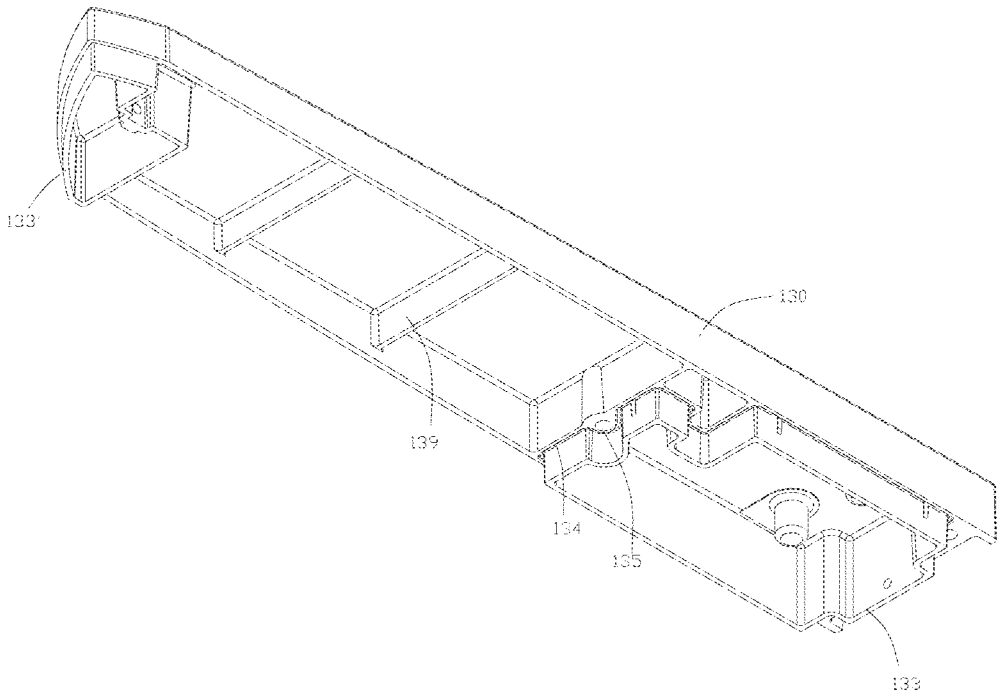
FIG. 4 is a structural schematic view of the sealing cover plate according to the present invention.

The housing 100 is made of thin-walled aluminum alloy material to ensure adequate structural hardness and rapid heat dissipation. The main wall thicknesses of the near-end housing 110 and the far-end housing 120 are from 1 mm to 5 mm. As shown in FIGS. 3 and 4, an inner wall surface of the near-end housing 110 is provided with a number of arcuately raised strip-shaped ribs 190, and each strip-shaped rib 190 has an internal threaded hole 191 formed at an end facing toward the open side. To ensure sealing performance and protection level of the luminaire, the inner side of the sealing cover plate 130 is provided with outwardly projecting frames 133, 133' that fit the open ends of the near-end housing 110 and the far-end housing 120. A gasket receiving groove 134 recessed inward is formed in an edge of the cover plate body at an outer side of the outwardly projecting frame 133. A sealing gasket is accommodated in the receiving groove 134 and has a surface exposed outward. The sealing cover plate 130 has screw holes 135 at positions corresponding to the strip-shaped ribs 190 for mounting the locking screws 131. When the sealing cover plate 130 is tightened by the locking screws 131, the sealing gasket is compressed to form a reliable seal at the joint surface, effectively preventing the ingress of rainwater and dust. A middle portion of the inner wall of the sealing cover plate 130 is provided with several reinforcing ribs 139.

The housing of the present invention adopts a modular splicing design. The near-end housing 110, the far-end housing 120, and the two sealing cover plates 130 are independent components. They are preliminarily integrated through rigid connections of the light source modules 200 and finally locked by the locking screws 131 of the sealing cover plates 130 to the strip-shaped ribs 190 on the sidewalls of the housing to complete assembly. This structure enables rapid disassembly and assembly. During maintenance, only the locking screws 131 of the sealing cover plate 130 need to be removed to detach the sealing cover plate 130, thereby providing unobstructed access to remove or replace any individual light source module 200 or the power module 300 inside the proximal/far-end housing, significantly improving on-site maintenance efficiency and reducing maintenance cost.

Multiple design measures ensure the sealing performance of the luminaire. First, the sealing cover plate 130 adopts a pre-compressed sealing structure at the joint with the housing opening. The sealing gasket 132 in the receiving groove 134 is uniformly compressed by the tightening force of the locking screws 131 through the outwardly projecting frame 133, forming a continuous and tight elastic sealing barrier on the joint surface. Second, the strip-shaped ribs 190 of the near-end housing not only serve reinforcement purposes but also provide firm anchoring points for the locking screws 131 through the threaded holes 191, ensuring stable tightening force and preventing sealing failure caused by vibration. With this design, the luminaire achieves a protection rating of IP66 or above, effectively resisting the ingress of rain, dust, and harsh outdoor environmental elements. Meanwhile, the strip-shaped ribs redirect the heat conduction path from lateral spread to axial diffusion, enhancing heat dissipation efficiency.

Referring to FIG. 2, the luminaire further includes a substrate 210 mounted on a light-emitting surface of each light source module 200 through a detachable connecting mechanism. Multiple through-holes 211 are formed in the substrate 210, and each through-hole 211 corresponds to at least one light source in the light source module 200. An opening size of each through-hole 211 is adapted to an outer contour size of its corresponding light source. The light source corresponding to the opening size adapted at this location should be understood as at least one light source. When a through-hole 211 corresponds to two or more light sources, the opening size of the through-hole 211 should be adapted to the outer contour size range covering the two or more light sources. The opening size of the through-hole 211 should ensure that the corresponding light source is fully exposed, and that a normal-direction orthographic projection area of the light source on the plane of the substrate 210 is not blocked by the substrate 210.

A light-blocking mechanism 212 is disposed on the substrate 210. The light-blocking mechanism 212 includes a light-blocking panel fixed to a surface of the substrate 210 and disposed vertically or obliquely along at least one side of a circumferential edge of the through-hole 211. The term "vertically" herein refers to a vertical orientation relative to an upper surface of the substrate 210 when the upper surface is assumed to be horizontal. The oblique orientation is likewise defined relative to the upper surface of the substrate 210.

This structure replaces a conventional external light-shielding grille with a detachable substrate, reducing the overall thickness of the module and making it particularly suitable for embedded installations or space-limited applications, avoiding positional deviations caused by fixture displacement. The design of the substrate allows the optical control of multiple light sources simultaneously. Each through-hole corresponds to a single light source or multiple light sources. The light-blocking panel acts independently on the output path of each light source to create physical shading and block light-spot overlap and cross-reflection interference between adjacent light sources.

Figure 5A:
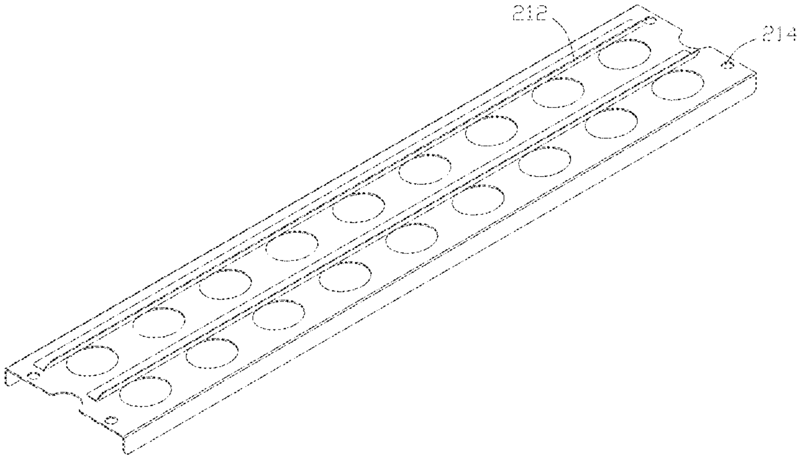
FIGS. 5*a*, 5*b*, and 5*c* are schematic views illustrating different arrangements of the through-holes and the light-blocking panels on the substrate.
Figure 5B:
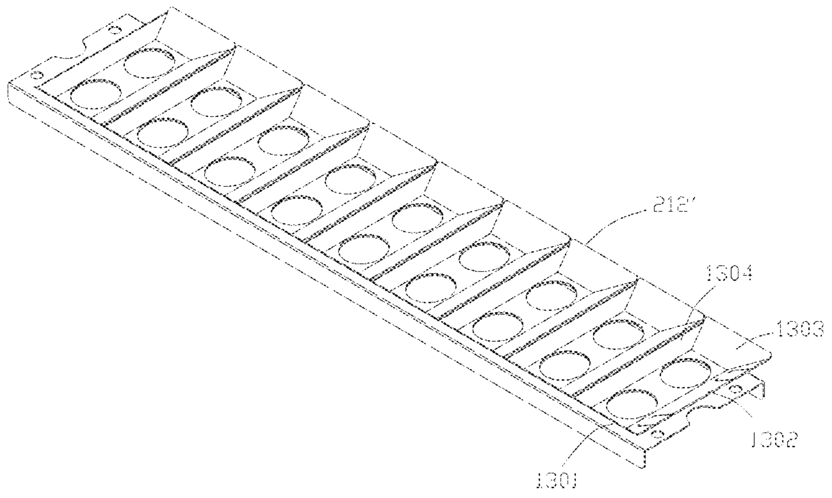
Figure 5C:
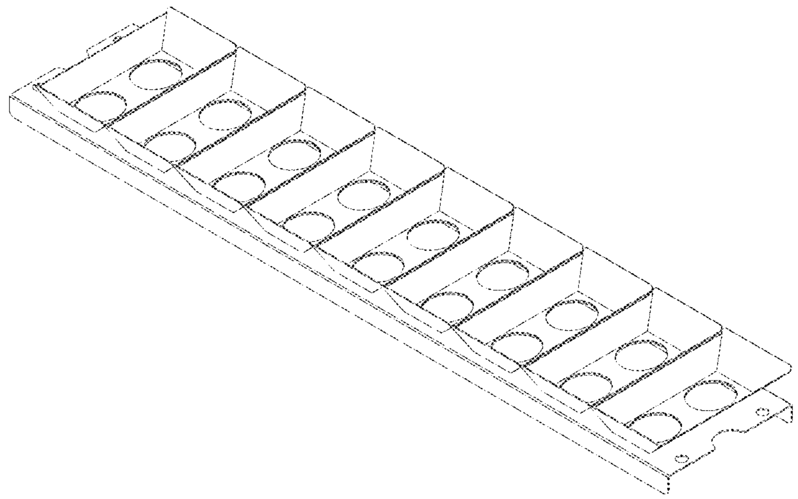

The light-blocking mechanism 212 is configured to physically block lateral stray light emitted from the light source. Its structural configuration is designed based on actual application scenarios. In specific examples, the through-hole 211 is opened for each individual light source on the light source module 200, as shown in FIGS. 5*a*, 5*b*, and 5*c*. Alternatively, adjacent light sources located on the same horizontal row, the same vertical column, or the same diagonal direction are grouped into a light source group, and each through-hole 211 is sized to match an outer contour of the corresponding light source group, as shown in FIG. 2. The light-blocking mechanism 212 may include a single light-blocking panel arranged on one side edge of a single through-hole 211, or along a linear arrangement of multiple through-holes 211 in the longitudinal direction or in a radial direction of the substrate. The light-blocking panel is a plate-shaped structure adapted to provide directional shading of light, and may have a rectangular, trapezoidal, or arcuate panel surface. As shown in FIG. 5*a*, the light-blocking panel extends continuously along the same linear direction at the same side edge of multiple through-holes 211, forming an elongated light-blocking panel. The light-blocking panel may be a vertically oriented plate or a plate having a certain oblique angle. The light-blocking mechanism physically blocks lateral light from the light source to reduce stray light spreading in non-target directions and to eliminate glare. It should be noted that the "radial direction" herein refers to a direction perpendicular to a long side of the substrate.

The light-blocking mechanism may alternatively include multiple light-blocking panels arranged around a periphery of a single through-hole, or around a periphery of a group of through-holes arranged linearly in the longitudinal direction or radial direction of the substrate, thereby forming a multi-sided light-blocking frame. As shown in FIGS. 5*b* and 5*c*, in certain specific examples, the light-blocking mechanism 212' adopts four light-blocking panels arranged around a group of through-holes arranged linearly in the radial direction of the substrate, thereby forming a four-sided light-blocking frame. The number of through-holes in the group is two. The spacing between the two through-holes is designed based on optical requirements of the light source module. As shown in FIG. 5*a*, the four-sided light-blocking frame is formed by sequentially connecting a first trapezoidal light-blocking surface 1301, a first side trapezoidal light-blocking surface 1302, a second trapezoidal light-blocking surface 1303, and a second side trapezoidal light-blocking surface 1304 around the periphery of the through-hole group. The first trapezoidal light-blocking surface 1301 and the second trapezoidal light-blocking surface 1303 have identical shapes and dimensions and are symmetrically arranged, and the first side trapezoidal light-blocking surface 1302 and the second side trapezoidal light-blocking surface 1304 are also symmetrically arranged.

Axial heights of the first trapezoidal light-blocking surface 1301, the first side trapezoidal light-blocking surface 1302, the second trapezoidal light-blocking surface 1303, and the second side trapezoidal light-blocking surface 1304 may be set according to application scenarios, and may all be equal, all be unequal, or partially equal. The inclination angles formed between each of the first trapezoidal light-blocking surface 1301, the first side trapezoidal light-blocking surface 1302, the second trapezoidal light-blocking surface 1303, and the second side trapezoidal light-blocking surface 1304 and a corresponding non-through-hole side surface of the substrate may also be set based on the application scenario and may all be equal, all be unequal, or partially equal. In other words, the axial heights and inclination angles of the first trapezoidal light-blocking surface 1301, the first side trapezoidal light-blocking surface 1302, the second trapezoidal light-blocking surface 1303, and the second side trapezoidal light-blocking surface 1304 of the four-sided light-blocking frame are non-limiting design parameters. Their specific values can be dynamically adjusted according to optical requirements, spatial constraints, and performance indicators of actual application scenarios. Design logic includes: glare level control: Increasing the height or adjusting the inclination angle enhances physical shading of direct light at specific viewing angles. Light distribution shaping: The inclination angle influences the light spreading range; small angles (e.g., 30°) enlarge the shading coverage, while large angles (e.g., 75°) reduce light spreading angles.

The substrate 210 of the present invention is connected to the light source module through a detachable connecting mechanism. The detachable connecting mechanism may adopt conventional mechanical structures in the field, including at least one connecting structure selected from threaded fastening components, elastic snap-fit components, and pressing components. As shown in FIGS. 2 and 5*a*, two ends of the substrate 210 in the longitudinal direction are connected to the light source module 200 by screw holes and fastening members. Screw holes 214 are formed at two longitudinal ends of the substrate 210, and the substrate 210 is connected to both ends of the light source module 200 by fastening members 215 passing through the screw holes 214.

It should be noted that the substrate 210 needs to have sufficient mechanical strength to support the light-blocking mechanism while also providing heat dissipation capability because it is located near the light source module, which typically generates heat. The light-blocking panel 213 needs to provide effective shading performance and should incorporate anti-glare surface treatment (such as a matte finish or light-absorbing coating) to reduce reflective glare. The substrate 210 and the light-blocking mechanism 212 may be made of aluminum alloy or high-temperature-resistant engineering plastics such as black PC, PBT, PA, or ABS, to provide adequate mechanical strength, heat resistance, and ease of machining and installation.

The light source module of the present invention utilizes its physical light-blocking function to effectively suppress glare and confine the spreading range of emitted light. By means of an asymmetric light-blocking panel, the design enhances shading of light in non-target regions. For example, in road-lighting applications, an asymmetric light-blocking panel prevents light from illuminating residential areas along the roadside while ensuring lighting performance on the roadway.

The present invention further provides a heat-isolation type power-chamber heat-dissipation boss structure. The core concept is to interrupt a heat conduction path from the light source to a housing of a power chamber by means of a "boss-gap" structure.

Figure 6:
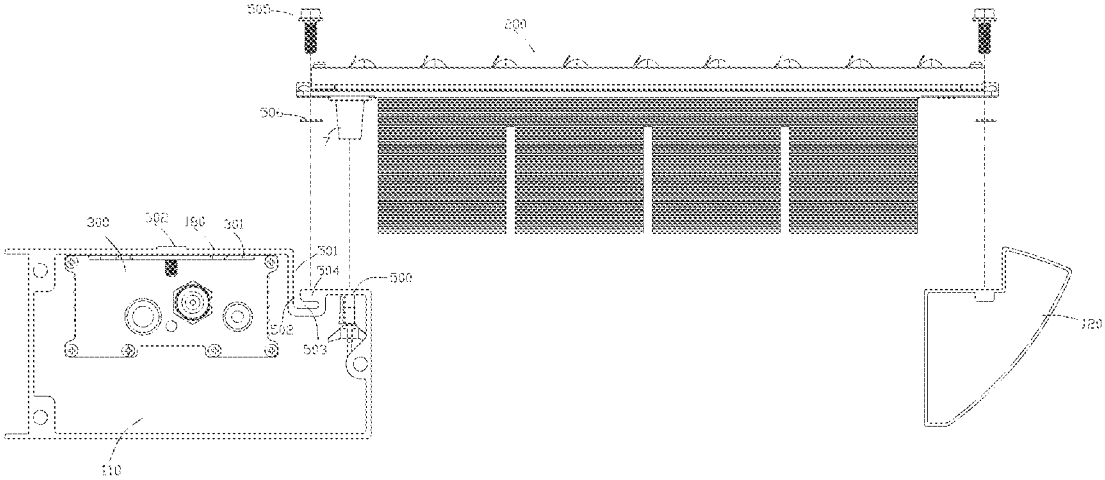
FIG. 6 is a schematic view illustrating the connecting relationship among the light source module, the near-end housing, and the far-end housing.
Figure 7:
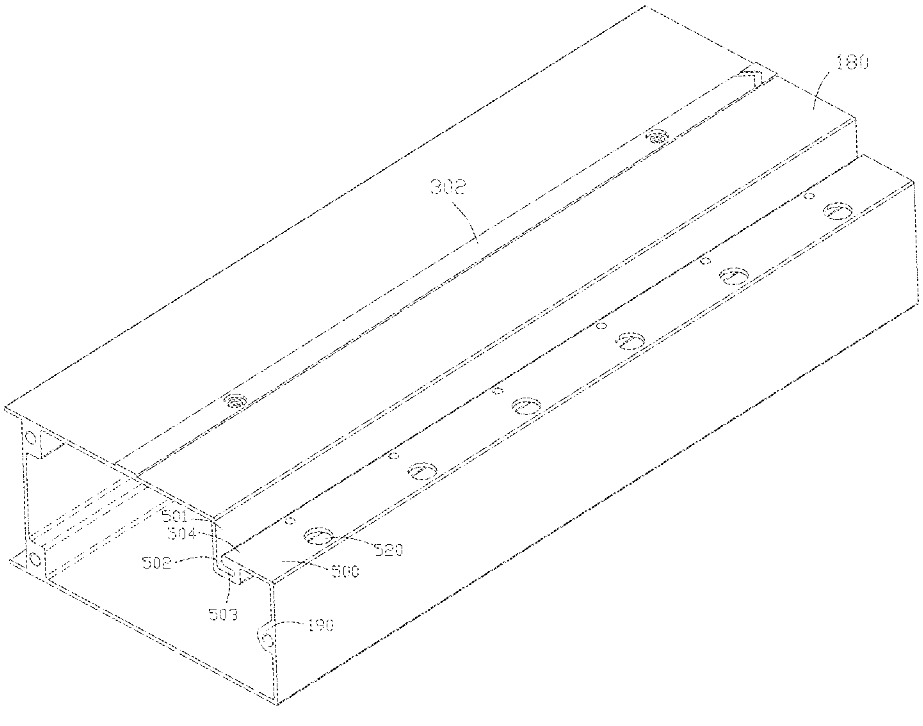
FIG. 7 is a structural schematic view of the near-end housing.

Referring to FIGS. 6 and 7, a housing wall surface of the near-end housing 110 that is joined to an inner side of the near-end stepped surface 500 serves as an abutment surface 501. A first gap 502 is formed by recessing downward from a side of the near-end stepped surface 500 close to the abutment surface 501, and a second gap 503 is formed by extending horizontally from a bottom of the first gap 502 toward a side away from the abutment surface 501. A connecting boss 504 is formed at a position of the second gap 503 corresponding to a portion of the near-end stepped surface 500 above the second gap 503. The first gap 502 and the second gap 503 together define an L-shaped heat-insulation cavity surrounding a root of the connecting boss 504. A connection end of the light source module is fixed to the connecting boss 504 by a connecting member, and a clearance is left between an outer side wall of the connection end and the abutment surface 501.

An outer side wall surface of the connecting boss 504 and the abutment surface 501 together define the first gap 502, which blocks radial heat conduction from the light source. The first gap 502 has a width in a range from 2 mm to 10 mm. The second gap 503 forms a bottom air-convection channel, and the second gap 503 has a height in a range from 2 mm to 10 mm. In this case, a clearance is also left between an end portion of the light source module 200 mounted on the connecting boss 504 and the abutment surface 501. The near-end stepped surface lowers a mounting height of the light source module 200, which is suitable for ultra-thin luminaires. By the single-point or local connection via the boss, a direct heat conduction cross-sectional area from the light source to a housing of the power chamber is significantly reduced. The lateral first gap blocks a radial heat conduction path, and the bottom second gap forms a chimney effect to enhance convective heat transfer.

A connection end of the light source module 200 is fixed to the connecting boss 504 by a connecting member. The connecting member may be a screw assembly, a spring clip, or another mechanism. Referring to FIGS. 3 and 6, the connecting member is a connecting screw 505, and a metal washer 506 is sleeved on the connecting screw 505. The metal washer 506 is located between the connection end portion of the light source module 200 and the connecting boss 504, so that a heat dissipation gap 507 is formed between the connection end portion of the light source module 200 and an upper wall surface of the connecting boss 504. The heat dissipation gap 507 has a thickness in a range from 1 mm to 5 mm. The heat dissipation gap 507 interrupts direct contact between the light source module 200 and the connecting boss 504 and reduces a heat conduction area to a cross-sectional area of the metal washer 506. Heat generated by the light source is locally transferred from the metal washer 506 to the connecting boss 504 and then rapidly dissipated.

Figure 8:
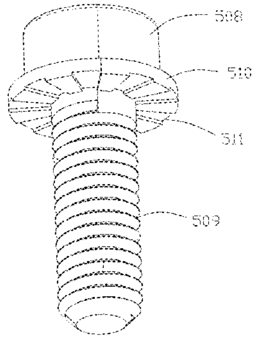
FIG. 8 is a structural schematic view of the pressing plate of the connecting screw.

Referring to FIG. 8, the connecting screw 505 includes a screw head 508 and a screw shank 509. A pressing plate 510 is coaxially fixed to an end face of the screw head 508 facing the screw shank 509, and the pressing plate 510 has a diameter greater than a diameter of the screw head 508. Multiple radial grooves 511 are formed on a pressing surface of the pressing plate 510, and the grooves 511 extend uniformly and radially from a center of the pressing plate 510 toward a circumferential edge. This design enables a more uniform pressure distribution, reduces a risk of micro-deformation of the connecting boss, and the grooves can also promote micro air flow, which helps with heat dissipation.

The near-end stepped surface 500 is formed with a power interface 520, which is a through-hole structure penetrating the near-end stepped surface 500. A sealed cable connector is inserted into the power interface 520. During installation, a power-line end of the light source module 200 is crimped with a waterproof terminal, and the sealed cable connector with the power line is inserted into the power interface 520. The sealed cable connector adopts an interference-fit design, and sealing is achieved by axial compression of a silicone sealing ring.

A surface of the near-end housing 110 that faces in the same direction as a light-emitting direction of the light source module 200 serves as a first panel 180, which is the same surface on which the near-end stepped surface 500 is provided. Referring to FIG. 6, a plate surface of the first panel 180 facing away from the light source module 200 serves as a power module mounting surface. The power module 300 has a plane tightly abutting against the power module mounting surface. The term "tightly abutting" herein means that the plane of the power module 300 is in gap-free close contact with the power module mounting surface. Thermal conductive silicone may be applied between the power module 300 and the power module mounting surface to enhance thermal coupling. Connection tabs 301 are provided at two ends of the power module 300, and the connection tabs 301 are fastened to the power module mounting surface by screws. Threaded holes are formed at positions of the power module mounting surface corresponding to the screws, and the screws are screwed therein. To enhance a fastening force of the screws, a reinforcing plate is provided below each connection lug, and the screws are screwed successively through the connection tabs and the reinforcing plates.

Reinforcing bosses 302 that protrude outward are formed at positions of the power module mounting surface corresponding to screw fastening locations. The first panel has a thickness in a range from 1 mm to 5 mm in non-reinforcing-boss regions, and has a thickness in a range from 4 mm to 8 mm at the reinforcing bosses 302, for example 5 mm. In other words, the reinforcing bosses 302 are provided on the power module mounting surface only at screw fastening points (that is, regions covered by the connection tabs). Heat generated by the driver power supply is dissipated to ambient air along a shortest thermal path through a direct contact surface and a thin wall, thereby reducing thermal resistance compared with conventional suspended mounting solutions. The driver power supply is mounted with its entire plane in contact with the mounting surface, making its temperature distribution more uniform and avoiding local hot spots.

Referring to FIG. 2, a tubular mounting sleeve 610 is connected to a top wall surface or a side wall surface of the near-end housing 110. The tubular mounting sleeve 610 is a detachable structure, for example connected by a screw assembly. A laser 611 for installation positioning is inserted into the tubular mounting sleeve 610 and is used as an auxiliary positioning tool during installation of the luminaire. A locking screw 612 is screwed into a tube wall of the tubular mounting sleeve 610, and an end of the locking screw 612 abuts against an outer surface of the laser 611, thereby enabling quick installation and removal of the laser 611 by means of the locking screw 612. The laser in this luminaire is not a lighting component, but is configured as an engineering-grade positioning tool. The laser, serving as a high-precision optical positioning auxiliary device, is mounted at the power-chamber housing structure, and provides an accurate optical reference during luminaire installation to assist in adjusting an illumination direction of the luminaire.

In addition, the luminaire further includes a lamp bracket 700 for connection to a pole-mount fixing member. Based on the above innovative technical features, the lamp bracket may adopt existing conventional bracket structures. The examples shown in FIGS. 1 and 2 are illustrative only and do not limit the scope of protection of the present invention.

Figure 9:
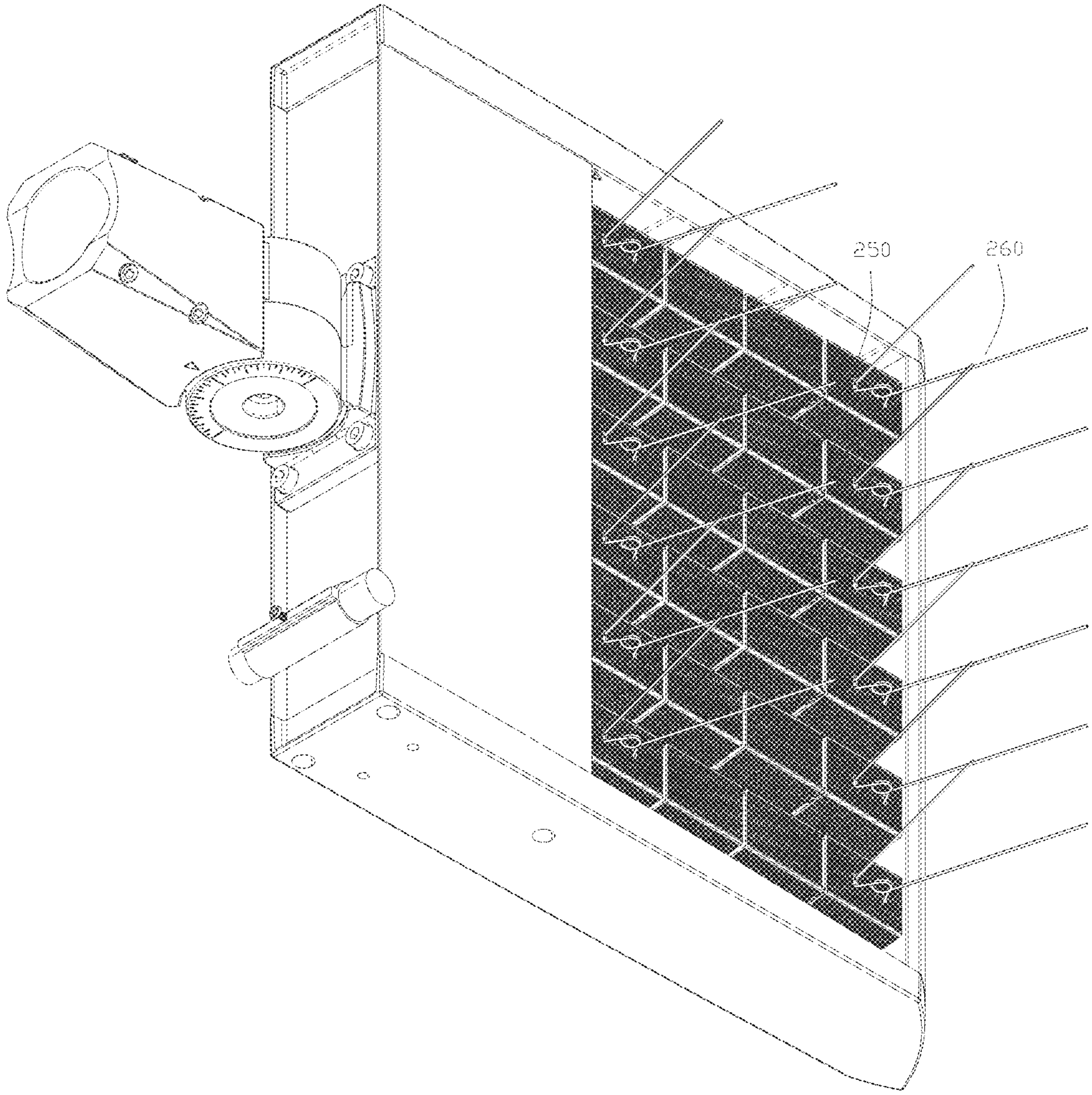
FIG. 9 is a structural schematic view of the heat sink of the modular LED luminaire.
Figure 10:
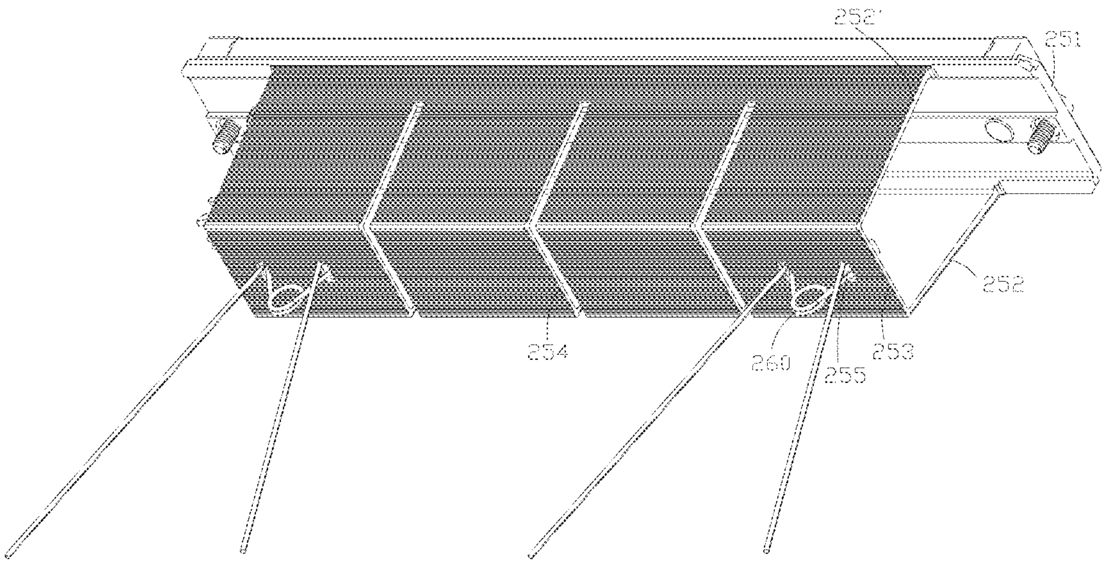
FIG. 10 is a schematic view showing a back-side structure of the light source module.

Referring to FIGS. 9 and 10, a heat sink 250 is provided on a back side of each light source module 200. The heat sink 250 includes a first heat dissipation plate 251 on which the light source module 200 is mounted. Second heat dissipation plates 252 and 252' extend integrally from two sides of a non-mounting surface of the first heat dissipation plate 251. End portions of the second heat dissipation plates 252 and 252' are connected by a third heat dissipation plate 253, thereby forming a ventilation flow channel having a quadrilateral cross section and having openings on two sides. Multiple heat dissipation slots 254 are formed on the third heat dissipation plate 253, each extending inward into the third heat dissipation plate 253 and toward the first heat dissipation plate 251. The heat dissipation slots 254 extend partially into the interiors of the two second heat dissipation plates 252 and 252' but do not extend to a junction between the second heat dissipation plates 252 and 252' and the first heat dissipation plate 251.

Specifically, in this solution, the heat dissipation slots 254 are present not only on a surface of the third heat dissipation plate 253 but also extend inward into the two second heat dissipation plates 252 and 252'. Although the heat dissipation slots 254 extend into the second heat dissipation plates 252 and 252', they do not reach a junction between the second heat dissipation plates 252 and 252' and the first heat dissipation plate 251. That is, a distance is kept between terminal ends of the heat dissipation slots 254 and the junction. The junction between the second heat dissipation plates 252 and 252' and the first heat dissipation plate 251 bears combined mounting stress and thermal stress and serves as a mechanically weak point. By terminating the heat dissipation slots 254 before the junction region, a risk of stress concentration caused by slotting at this region is avoided, which is a mechanically weak region. At the same time, the un-slotted region maintains a continuous cross section of the second heat dissipation plates 252 and 252', ensuring overall bending stiffness.

Based on a basic principle of providing heat dissipation slots to enhance heat dissipation efficiency, the heat dissipation slots may be formed in various shapes according to actual needs. In some examples, the heat dissipation slots may be straight slots, wavy slots, or zigzag slots, for example wavy slots with a wavelength of 3 to 8 mm, or zigzag slots with an included angle of 100° to 130°.

To ensure a balance between heat dissipation area and structural strength, the heat dissipation slots 254 have a width in a range from 0.5 cm to 2 cm, and a spacing between adjacent heat dissipation slots 254 is in a range from 5 cm to 10 cm. A length of each heat dissipation slot 254 along a length direction of the second heat dissipation plates 252 and 252' is in a range from one-half to five-sixths of a total length of the second heat dissipation plates 252 and 252'. Portions of the second heat dissipation plates 252 and 252' corresponding to ends of the heat dissipation slots 254 have a certain remaining length, to avoid stress concentration at terminal ends of the slots and to prolong service life.

The quadrilateral cross section may be any regular or irregular quadrilateral. In one preferred embodiment of the present invention, the quadrilateral cross section is an isosceles trapezoid. The two second heat dissipation plates 252 and 252' serve as two waist edges of the isosceles trapezoid. The third heat dissipation plate 253 serves as a short edge of the isosceles trapezoid. The heat dissipation slots 254 are straight slots that extend across the third heat dissipation plate 253 in a direction perpendicular to a plane of the first heat dissipation plate 251 and extend partially into the second heat dissipation plates 252 and 252'.

Multiple strip-shaped heat dissipation fins are arranged on an outer surface of each second heat dissipation plate 252 or 252', sequentially from an end close to the first heat dissipation plate 251 toward an end away from the first heat dissipation plate 251. The heat dissipation fins are parallel to an edge where the second heat dissipation plates 252 and 252' join the first heat dissipation plate 251. Multiple second heat dissipation fins are arranged in parallel on the third heat dissipation plate 253. A large area of heat dissipation fins significantly increases a heat dissipation area.

In addition, at least one pair of clamping holes 255 having collinear axes is formed on the third heat dissipation plate 253. The heat sink further includes an elastic clamping member 260. The elastic clamping member 260 is formed by integrally bending a metal wire, requiring no welding or assembly and simplifying manufacturing.

Figure 11:
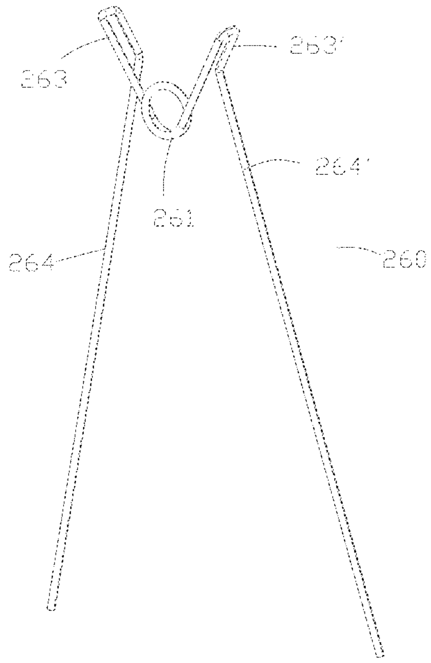
FIG. 11 is a structural schematic view of the elastic clamping member of the light source module.

Referring to FIG. 11, the elastic clamping member 260 includes a ring-shaped torsion spring 261 located at a middle portion, and a first support leg and a second support leg extending symmetrically outward from two ends of the ring-shaped torsion spring 261 in opposite directions. Terminal ends of the support legs are bent back to form U-shaped clamping portions 263 and 263'. Strip-shaped barbed portions 264 and 264' extend from free ends of the U-shaped clamping portions 263 and 263' in directions away from a center of the ring-shaped torsion spring 261. The U-shaped clamping portions 263 and 263' and the clamping holes 255 form a bidirectional axial clamping engagement. The strip-shaped barbed portions are distributed around an outer periphery of the third heat dissipation plate 253. The "bidirectional axial clamping engagement" means bidirectional fixation in an axial direction of the holes, enabling the U-shaped clamping portions and the clamping holes to engage without axial disengagement after installation. The ring-shaped torsion spring 261 and elasticity of the metal wire provide a continuous clamping force to ensure long-term contacting engagement with the clamping holes in an installed state.

During use, the U-shaped clamping portions of the elastic clamping member 260 are simply inserted into the clamping holes to complete installation. The U-shaped clamping portions and the collinear clamping holes on the heat dissipation plate form bidirectional axial locking to prevent displacement of the elastic clamping member caused by vibration or thermal expansion and contraction.

Each embodiment in this specification is described in a progressive manner. Identical or similar portions among the embodiments may be referenced to one another. Each embodiment focuses on differences from other embodiments. Particularly for device embodiments, because they are substantially similar to method embodiments, their description is simplified, and relevant portions may refer to descriptions in the method embodiments.

The above descriptions are merely specific embodiments of the present invention and are not intended to limit a scope of the present invention. Any variations or substitutions that may be conceived by a person skilled in the art within a scope of the technical disclosure of the present invention shall fall within the protection scope of the present invention. Therefore, the protection scope of the present invention shall be subject to the appended claims.

What is claimed is:

1. A modular light emitting diode (LED) luminaire, comprising:

a frame-shaped housing, a plurality of light source modules mounted in the frame-shaped housing, and a power module, wherein the frame-shaped housing comprises a first housing member, a second housing member, a first sealing cover plate, and a second sealing cover plate;

wherein the first housing member and the second housing member are spaced apart from each other in a first direction, and each of the first housing member and the second housing member is open at two opposite ends in a second direction transverse to the first direction;

wherein the first sealing cover plate is connected to one of the two opposite ends of the first housing member and to one of the two opposite ends of the second housing member, and the second sealing cover plate is connected to the other one of the two opposite ends of the first housing member and to the other one of the two opposite ends of the second housing member, so that the first housing member, the second housing member, the first sealing cover plate, and the second sealing cover plate together form the frame-shaped housing;

wherein the power module is accommodated in an interior space of the first housing member;

wherein the first housing member has a first surface facing in a same direction as emitting surfaces of the plurality of light source modules, the first surface of the first housing member being provided with a first stepped surface at a side of the first housing member facing the second housing member;

wherein the second housing member has a second surface facing in the same direction as the emitting surfaces of the plurality of light source modules, the second surface of the second housing member being provided with a second stepped surface at a side of the second housing member facing the first housing member;

wherein each of the plurality of light source modules has a first end mounted on the first stepped surface and a second end mounted on the second stepped surface;

wherein each of the plurality of light source modules comprises a plurality of light sources arranged in a matrix on a corresponding one of the emitting surfaces;

wherein a substrate is removably connected to the emitting surface of each of the plurality of light source modules through a detachable connection mechanism, the substrate defining a plurality of through-holes, each of the plurality of through-holes corresponding to at least one of the plurality of light sources and having an opening contour corresponding to an outer contour of the at least one of the plurality of light sources; and wherein a light-blocking mechanism is disposed on the substrate, the light-blocking mechanism comprising at least one light-blocking panel fixed to a surface of the substrate and extending perpendicularly or obliquely relative to the surface of the substrate along at least one peripheral edge of at least one of the plurality of through-holes.

2. The modular LED luminaire of claim 1, wherein a wall thickness of the first housing member is 1 mm to 5 mm, and an inner wall surface of the first housing member is provided with a plurality of arcuately raised strip-shaped ribs, each of the plurality of arcuately raised strip-shaped ribs defining an internal threaded hole at an end thereof facing a corresponding one of openings defined at the two opposite ends of the first housing member;

wherein each of the first sealing cover plate and the second sealing cover plate has an inner surface provided with a first projecting frame and a second projecting frame, the first projecting frame being fitted with a corresponding one of the openings defined at the two opposite ends of the first housing member, and the second projecting frame being fitted with a corresponding one of openings defined at the two opposite ends of the second housing member;

wherein each of the first sealing cover plate and the second sealing cover plate defines a gasket-receiving groove recessed along an edge of a plate body thereof and located outside the first projecting frame, the gasket-receiving groove receiving a sealing gasket having an outer surface exposed from the gasket-receiving groove;

wherein each of the first sealing cover plate and the second sealing cover plate defines screw holes at positions corresponding to the internal threaded holes of the plurality of arcuately raised strip-shaped ribs, the screw holes being configured to receive locking screws; and wherein the inner surface of each of the first sealing cover plate and the second sealing cover plate is provided with a plurality of reinforcing ribs.

3. The modular LED luminaire of claim 1, wherein each of the plurality of through-holes corresponds to either a respective individual light source of the plurality of light sources or a corresponding light source group comprising a plurality of adjacent light sources arranged in a row direction, a column direction, or a diagonal direction of the matrix of the plurality of light sources, and each of the plurality of through-holes has an opening contour corresponding to an outer contour of the respective individual light source or the corresponding light source group;

wherein the at least one light-blocking panel is disposed along a peripheral edge of a single one of the plurality of through-holes or along same-side peripheral edges of a plurality of the through-holes arranged linearly in a length direction or a width direction of the substrate.

4. The modular LED luminaire of claim 3, wherein the at least one light-blocking panel has a plate-shaped structure configured to directionally block light emitted from the corresponding light source module, and the plate-shaped structure has a shape selected from a rectangular shape, a trapezoidal shape, or an arcuate shape;

wherein the substrate has two opposite ends in a length direction thereof, the two opposite ends being provided with screw holes, and the substrate is connected to two opposite ends of the corresponding light source module by fasteners extending through the screw holes; and wherein each of the substrate and the at least one light-blocking panel is made of aluminum alloy, black glass-fiber-reinforced polycarbonate, or acrylonitrile-butadiene-styrene plastic.

5. The modular LED luminaire of claim 1, wherein the first housing member comprises a first panel facing in an emitting direction of the corresponding light source module, and an abutment surface adjoining an inner side of the first stepped surface;

wherein a first gap is recessed from a side of the first stepped surface adjacent to the abutment surface in a direction opposite to the emitting direction, and a second gap extends from a bottom of the first gap in a direction away from the abutment surface;

wherein a portion of the first stepped surface located on a side of the second gap opposite to the first gap forms a connecting boss;

wherein the first gap and the second gap communicate with each other to form an L-shaped thermal-insulation cavity at least partially surrounding a root portion of the connecting boss; and wherein a connecting end of the light corresponding source module is fixed to the connecting boss by a connecting member, and an outer sidewall of the connecting end is spaced apart from the abutment surface.

6. The modular LED luminaire of claim 5, wherein a width of the first gap is 2 mm to 10 mm, and a height of the second gap is 2 mm to 10 mm.

7. The modular LED luminaire of claim 5, wherein the connecting member is a connecting screw, and a metal washer is fitted around the connecting screw wherein the metal washer is disposed between a connecting end portion of the corresponding light source module and the connecting boss, so that a heat dissipation gap is formed between the connecting end portion of the corresponding light source module and a surface of the connecting boss facing the connecting end portion, the heat dissipation gap having a thickness of 1 mm to 5 mm;

wherein the connecting screw comprises a screw head, a screw rod, and a pressing plate coaxially connected to the screw head at a side of the screw head facing the screw rod, the pressing plate having a diameter greater than a diameter of the screw head; and wherein a pressing surface of the pressing plate defines a plurality of radially extending grooves, the plurality of radially extending grooves being circumferentially spaced apart from one another and extending from a central region of the pressing plate toward an outer circumferential edge of the pressing plate.

8. The modular LED luminaire of claim 1, wherein the first stepped surface defines a power interface, and a sealed cable connector is inserted into the power interface;

wherein the first housing member comprises a first panel facing in an emitting direction of the corresponding light source module, and a surface of the first panel facing away from the corresponding light source module serves as a mounting surface for the power module;

wherein the power module has a planar surface in close contact with the mounting surface; and wherein two opposite ends of the power module are provided with connection tabs, and the connection tabs are secured to the mounting surface by screws.

9. The modular LED luminaire of claim 1, wherein a tubular mounting sleeve is connected to a top wall surface or a side wall surface of the first housing member;

wherein a laser positioning device is inserted into the tubular mounting sleeve and is configured to assist installation positioning of the modular LED luminaire;

wherein a locking screw is threaded through a wall of the tubular mounting sleeve, and an end of the locking screw presses against an outer surface of the laser positioning device.

10. The modular LED luminaire of claim 1, wherein a heat sink is disposed on a back surface of each of the plurality of light source modules, the back surface being opposite to the emitting surface of the corresponding light source module;

wherein the heat sink comprises a first heat dissipation plate, a pair of second heat dissipation plates, and a third heat dissipation plate;

wherein the corresponding light source module is mounted on a mounting surface of the first heat dissipation plate;

wherein the pair of second heat dissipation plates integrally extend from two opposite sides of a surface of the first heat dissipation plate opposite to the mounting surface;

wherein the third heat dissipation plate connects end portions of the pair of second heat dissipation plates, so that the first heat dissipation plate, the pair of second heat dissipation plates, and the third heat dissipation plate together define a ventilation channel having a quadrilateral cross section and two opposite open ends; and wherein the third heat dissipation plate defines a plurality of heat dissipation slots, each of the plurality of heat dissipation slots extending from the third heat dissipation plate toward the first heat dissipation plate and extending partially into the pair of second heat dissipation plates.

* * * * *